United States Patent
Jeong et al.

(10) Patent No.: US 12,237,539 B2
(45) Date of Patent: Feb. 25, 2025

(54) BATTERY MODULE AND BATTERY PACK INCLUDING THE SAME

(71) Applicant: LG Energy Solution, Ltd., Seoul (KR)

(72) Inventors: Jee Hoon Jeong, Daejeon (KR); Junyeob Seong, Daejeon (KR); Kitaek Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 706 days.

(21) Appl. No.: 17/432,751

(22) PCT Filed: May 11, 2020

(86) PCT No.: PCT/KR2020/006185
§ 371 (c)(1),
(2) Date: Aug. 20, 2021

(87) PCT Pub. No.: WO2020/262820
PCT Pub. Date: Dec. 30, 2020

(65) Prior Publication Data
US 2022/0149484 A1    May 12, 2022

(30) Foreign Application Priority Data

Jun. 25, 2019 (KR) ........................ 10-2019-0075827

(51) Int. Cl.
*H01M 50/507* (2021.01)
*H01M 50/211* (2021.01)
(Continued)

(52) U.S. Cl.
CPC ....... *H01M 50/507* (2021.01); *H01M 50/211* (2021.01); *H01M 50/516* (2021.01);
(Continued)

(58) Field of Classification Search
CPC ............ H01M 50/507; H01M 50/505; H01M 50/502; H01M 50/516; H01M 50/533; H01M 50/211; H01M 50/536
(Continued)

(56) References Cited

U.S. PATENT DOCUMENTS

2013/0012079 A1    1/2013 Sakae et al.
2013/0130071 A1    5/2013 Adachi et al.
(Continued)

FOREIGN PATENT DOCUMENTS

CN    102870254 A    1/2013
CN    108140494 A    6/2018
(Continued)

OTHER PUBLICATIONS

Extended European Search Report for EP Application No. 20831493.0 dated Feb. 17, 2022. 6 pgs.
(Continued)

*Primary Examiner* — James M Erwin
*Assistant Examiner* — John S Medley
(74) *Attorney, Agent, or Firm* — Lerner David LLP (57) ABSTRACT

A battery module includes: a battery cell stack in which a plurality of battery cells are stacked, a busbar frame connected to the battery cell stack, a busbar, cell terraces each protruding from mutually adjacent battery cells among the plurality of battery cells included in the battery cell stack, and electrode leads each protruding from the cell terraces and having the same polarity, wherein at least one of the cell terraces defines a bending portion that contacts the busbar.

17 Claims, 7 Drawing Sheets

(51) Int. Cl.
*H01M 50/516* (2021.01)
*H01M 50/533* (2021.01)
*H01M 50/536* (2021.01)

(52) U.S. Cl.
CPC ....... *H01M 50/533* (2021.01); *H01M 50/536* (2021.01); *H01M 2220/20* (2013.01)

(58) Field of Classification Search
USPC .......................................................... 429/158
See application file for complete search history.

(56) References Cited

U.S. PATENT DOCUMENTS

| | | |
|---|---|---|
| 2014/0127550 A1 | 5/2014 | Roh et al. |
| 2016/0233476 A1* | 8/2016 | Okamoto ............ H01M 50/522 |
| 2017/0301434 A1* | 10/2017 | Chen ........................ H01B 3/30 |
| 2018/0194235 A1 | 7/2018 | Kim et al. |
| 2018/0269459 A1 | 9/2018 | Tsuchiya et al. |
| 2018/0301686 A1* | 10/2018 | Botadra .............. H01M 50/512 |
| 2019/0001838 A1 | 1/2019 | Choi et al. |
| 2019/0189979 A1 | 6/2019 | Choi et al. |
| 2019/0305284 A1 | 10/2019 | Lee et al. |
| 2019/0341594 A1* | 11/2019 | Morisato ............ H01M 50/534 |
| 2019/0348727 A1 | 11/2019 | Yoon et al. |
| 2020/0020915 A1 | 1/2020 | Chi et al. |
| 2020/0067066 A1 | 2/2020 | Kim et al. |
| 2020/0099024 A1 | 3/2020 | Ryu et al. |
| 2020/0144580 A1 | 5/2020 | Hong et al. |
| 2020/0189400 A1 | 6/2020 | Kim et al. |
| 2020/0350547 A1 | 11/2020 | Chi et al. |
| 2020/0395693 A1 | 12/2020 | Matsumura et al. |
| 2020/0411832 A1 | 12/2020 | Jin et al. |
| 2022/0271376 A1 | 8/2022 | Jin et al. |

FOREIGN PATENT DOCUMENTS

| | | | |
|---|---|---|---|
| CN | 108463902 A | | 8/2018 |
| EP | 3671902 A1 | | 6/2020 |
| JP | 2005044583 A | | 2/2005 |
| JP | 2007214025 A | | 8/2007 |
| JP | 2011171114 A | | 9/2011 |
| JP | 2012059658 A | | 3/2012 |
| JP | 2014523623 A | | 9/2014 |
| JP | 2018533830 A | | 11/2018 |
| JP | 2019500736 A | | 1/2019 |
| KR | 20140038037 A | | 3/2014 |
| KR | 20170103232 A | | 9/2017 |
| KR | 20180119372 A | | 11/2018 |
| KR | 20180130281 A | | 12/2018 |
| KR | 20180137293 A | | 12/2018 |
| KR | 20190016691 A | * 2/2019 | ........... B23K 1/0016 |
| KR | 20190040402 A | | 4/2019 |
| KR | 20190060376 A | | 6/2019 |
| KR | 20190063814 A | | 6/2019 |
| WO | 2018168280 A1 | | 9/2018 |
| WO | 2018199449 A1 | | 11/2018 |
| WO | 2019045238 A1 | | 3/2019 |
| WO | 2019059133 A1 | | 3/2019 |
| WO | 2019074211 A1 | | 4/2019 |
| WO | 2019107735 A1 | | 6/2019 |
| WO | 2019117514 A1 | | 6/2019 |

OTHER PUBLICATIONS

Search Report dated Nov. 28, 2022 from the Office Action for Chinese Application No. 202080029320.3 issued Dec. 5, 2022, pp. 1-4. [See p. 2, categorizing the cited references].

International Search Report for Application No. PCT/KR2020/006185 mailed Aug. 31, 2020, pp. 1-3.

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/006185, filed May 11, 2020, published in Korean, which claims the benefit of Korean Patent Application No. 10-2019-0075827 filed on Jun. 25, 2019 with the Korean Intellectual Property Office, the disclosures of which are incorporated herein by reference in their entireties.

TECHNICAL FIELD

The present disclosure relates to a battery module and a battery pack including the same, and more particularly to a battery module which reduces the size of the battery module and prevents a stability problem due to an unintended electrical connection, and a battery pack including the same.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

In small-sized mobile devices, one or several battery cells are used per device, while in middle- or large-sized devices such as vehicles, a middle- or large-sized battery pack in which a large number of battery cells are electrically connected is used due to necessity of high output and large capacity.

Meanwhile, recently, as the need for a large capacity structure is increasing along with the utilization as an energy storage source, there is a growing demand for a battery pack with a multi-module structure in which a plurality of battery modules, each including a plurality of secondary batteries connected in series and/or in parallel, are integrated.

Meanwhile, when a plurality of battery cells are connected in series/parallel to configure a battery pack, it is common to configure a battery module composed of at least one battery cell first, and then configure a battery pack by using at least one of the battery modules and adding other components.

When a battery cell stack and a busbar are connected to each other in a battery module, the location of the busbar may significantly influence the size of the battery module. Accordingly, an improvement for a cell lead welding structure for optimizing the location of the busbar is necessary. In addition, in a conventional battery module, if the numbers of cell terraces and battery cells increase, the number of electrode leads also increases as much as that, and the shapes of the electrode leads and the cell terraces become compact. Thus, peripheries of adjacent electrode leads and the cell terraces contact each other to cause problems such as a deterioration in the lifetime of the battery cells.

DETAILED DESCRIPTION OF THE INVENTION

Technical Problem

It is an object of the present disclosure to provide a battery module that has a compact structure by changing a coupling structure of electrode leads and busbars and improve an electrical stability, and a battery pack including the battery module.

However, the problem to be solved by embodiments of the present disclosure is not limited to the above-described problems, and can be variously expanded within the scope of the technical idea included in the present disclosure.

Technical Solution

A battery module according to an embodiment of the present disclosure includes a battery cell stack in which a plurality of battery cells are stacked, a busbar frame connected to the battery cell stack, a busbar, cell terraces each protruding from mutually adjacent battery cells among the plurality of battery cells included in the battery cell stack, and electrode leads each protruding from the cell terraces and having the same polarity, wherein at least one of the cell terraces defines a bending portion that contacts the busbar.

The busbar includes a first surface facing the battery cell stack and a second surface located on an opposite side to the first surface, the at least one of the cell terraces that defines the bending portion may pass through a slot formed in the busbar from the first surface and may be bent on the second surface to form the bending portion.

The electrode leads may be superimposed on each other on the second surface of the busbar, a welding part may be formed in a portion of the busbar portion superimposing on the electrode leads, and the bending portion may be formed between the welding part and the slot.

Each of the plurality of the battery cells includes an electrode assembly and a cell case accommodating the electrode assembly, and each of the cell terraces extends from the cell case of its respective battery cell to be integrally formed with the cell case.

The busbar may be formed of a metal.

The busbar may be formed of an insulation member.

A slot, through which at least one of the electrode leads passes, may be formed in the busbar and a metal member covering the busbar may be formed around the slot.

The busbar includes a first surface facing the battery cell stack and a second surface located on an opposite side to the first surface, and the metal member may be located on the second surface.

The metal member may be located in a recessed portion formed in the busbar.

A battery pack according to another embodiment of the present disclosure includes the above-mentioned battery module.

Advantageous Effects

According to embodiments of the present disclosure, cell terraces pass through slots formed in busbars, and ends of the cell terraces are bent to couple electrode leads and the busbars, so that the lengthwise size of a battery module can be reduced to decrease the weight thereof. Accordingly, the energy density per unit volume of the battery module may increase.

Further, by preventing the electrode leads from contacting peripheries of the cells which are adjacent thereto, the battery module that prevents corrosion of pouch type cell cases and shortening of the lifetime of the cells can be realized.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or above a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 1:
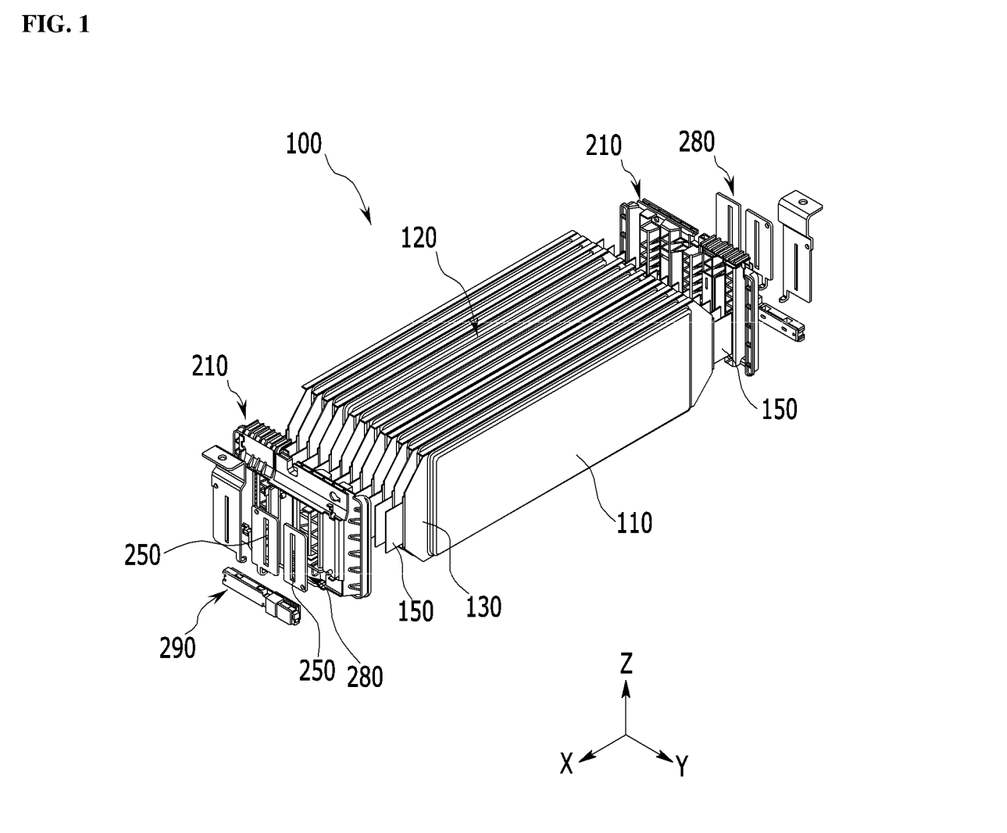
FIG. 1 is an exploded perspective view illustrating a battery module according to an embodiment of the present disclosure.
Figure 2:
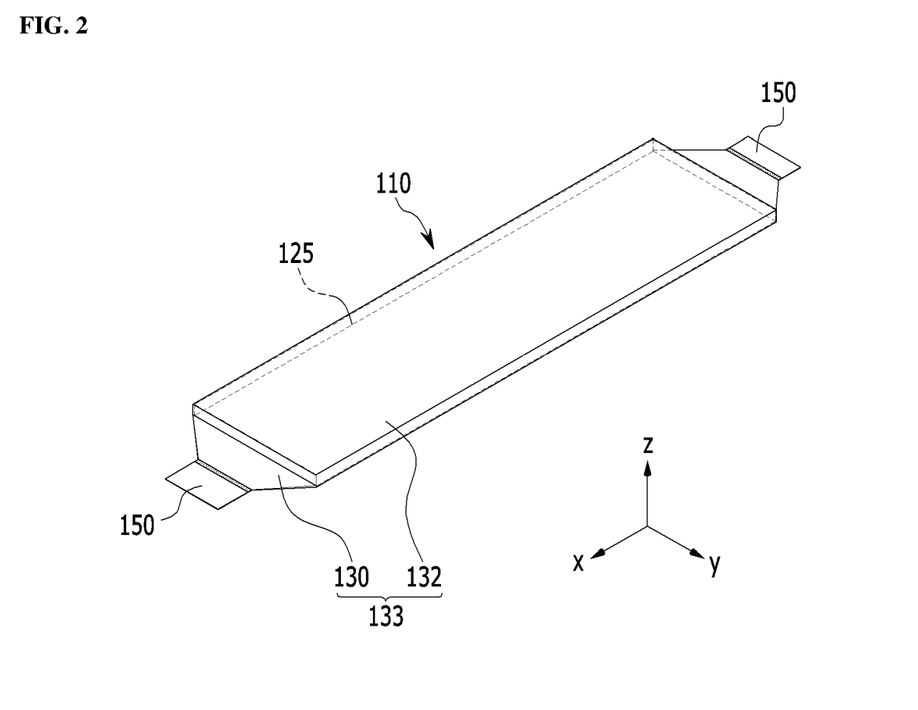
FIG. 2 is a perspective view of a battery cell included in the battery module of FIG. 1.

FIG. 1 is an exploded perspective view illustrating a battery module according to an embodiment of the present disclosure. FIG. 2 is a perspective view of a battery cell included in the battery module of FIG. 1.

Referring to FIG. 1, the battery module 100 according to the present embodiment may include a battery cell stack 120 in which a plurality of the battery cells 110 are stacked, electrode leads 150 each protruding from opposite ends of the battery cell stack 120, a busbar frame 210, a busbar 280, and an IC board 290. The busbar frame 210 includes lead slots, the lead slots may be arranged so as to correspond to slots 250 formed in the busbars, and the electrode leads may be electrically connected to the busbar 280. The busbars 280 according to the present embodiment may be formed of a metallic material.

Hereinafter, a configuration of one battery cell 110 will be described with reference to FIG. 2.

Referring to FIGS. 1 and 2, the battery cells 110 may be a secondary battery, which may be formed of a pouch type secondary battery. The battery cells 110 may be formed of a plurality of cells, and the plurality of the battery cells 110 may be stacked to be electrically connected to each other, and thus the battery cell stack 120 may be formed.

Each of the plurality of the battery cells 110 may include the electrode assembly 125, a cell case 133, and an electrode lead 150 protruding from the electrode assembly 125.

The electrode assembly 125 may include an anode plate, a cathode plate, a separator, and the like. The cell case 133 is adapted to package the electrode assembly 125 and may be formed of a laminate sheet including a resin layer and a metal layer. The cell case 133 may include a case body 132 and cell terraces 130.

The case body 132 may accommodate the electrode assembly 125. To achieve this, an accommodation space that may accommodate the electrode assembly 125 is provided in the case body 132. The cell terrace 130 extends from the case body 132 and is sealed so as to seal the electrode assembly 125. The electrode lead 150 may partially protrude on one side of the cell terrace 130, in detail, on the front side of the cell terrace 130 (+X-axis direction).

The electrode lead 150 may be electrically connected to the electrode assembly 125. The electrode leads 150 may be provided with a pair. Portions of a pair of the electrode leads 150 may protrude from a front side (+X-axis direction) and a rear side (−X-axis direction) of the cell case 133 to the exterior of the cell terrace 130, respectively.

The above-mentioned configuration of the battery cell 110 is an example, and the shape of the battery cell 110 that constitutes the battery cell stack 120 may be variously modified.

Figure 3:
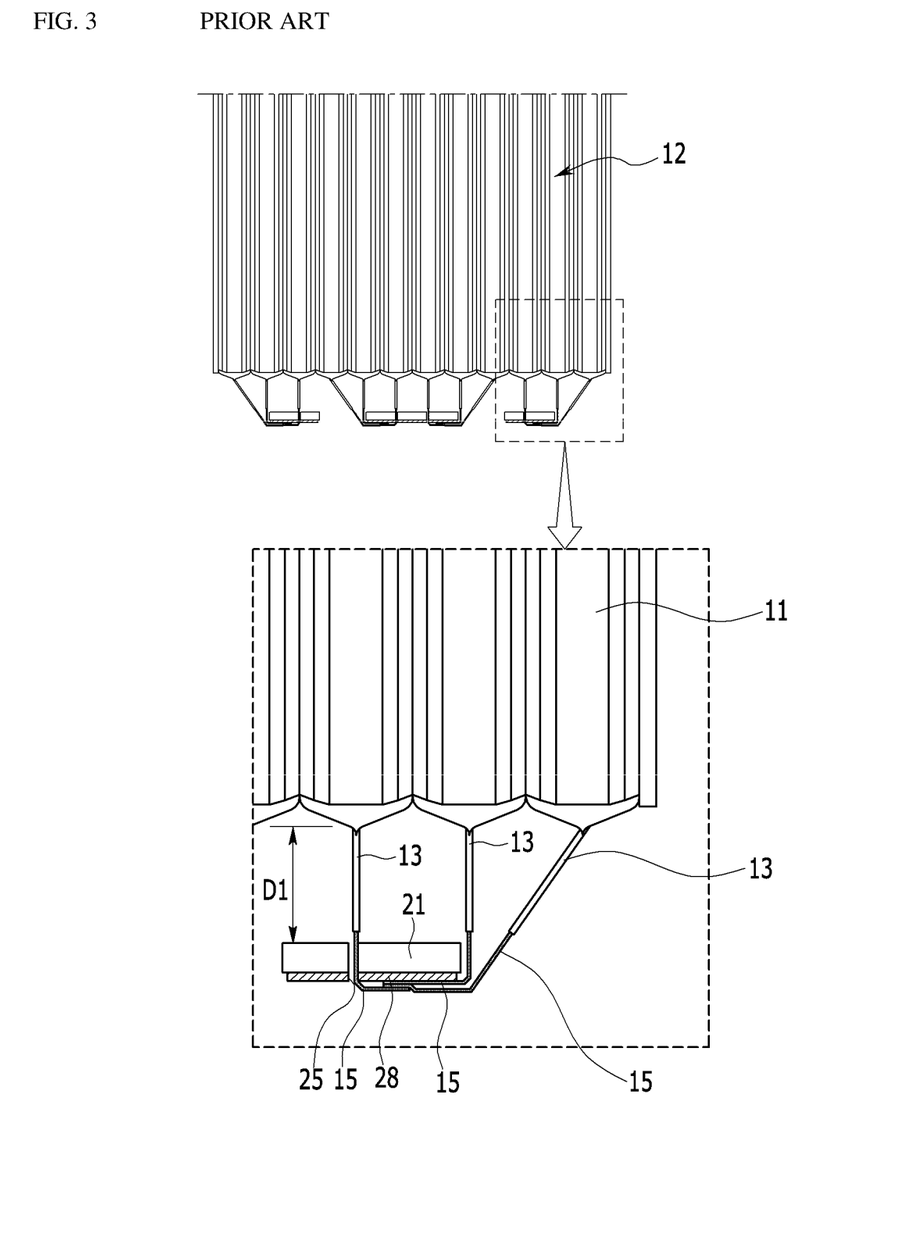
FIG. 3 is a plan view schematically illustrating a coupling relationship between a battery cell stack and a busbar according to a comparative example.

FIG. 3 is a plan view schematically illustrating a coupling relationship between the battery cell stack and the busbars according to a comparative example.

FIG. 3 is the plan view that is viewed downwards in a z-axis direction of FIG. 1, in which a plurality of the battery cells 11 are stacked to form the battery cell stack 12, the cell terrace 13 protrudes out from each of the battery cells 11, and the electrode lead 15 extends from an end of the cell terrace 13. The cell terrace 13 surrounds the electrode lead 15 connected to the battery cell 11, and the electrode lead 15 passes through a lead slot of the busbar frame 21 and a slot 25 of the busbar 28. A plurality of the electrode leads 15 may be mutually welded together with the busbar 28 on one surface of the busbar 28.

In this way, in the battery module according to a conventional comparative example, the busbar 28 and the battery cell stack 12 may define a first distance D1 according to coupling relationship between the electrode lead 15 and the busbar 28, and the first distance D1 may influence the size of the battery module.

Figure 4:
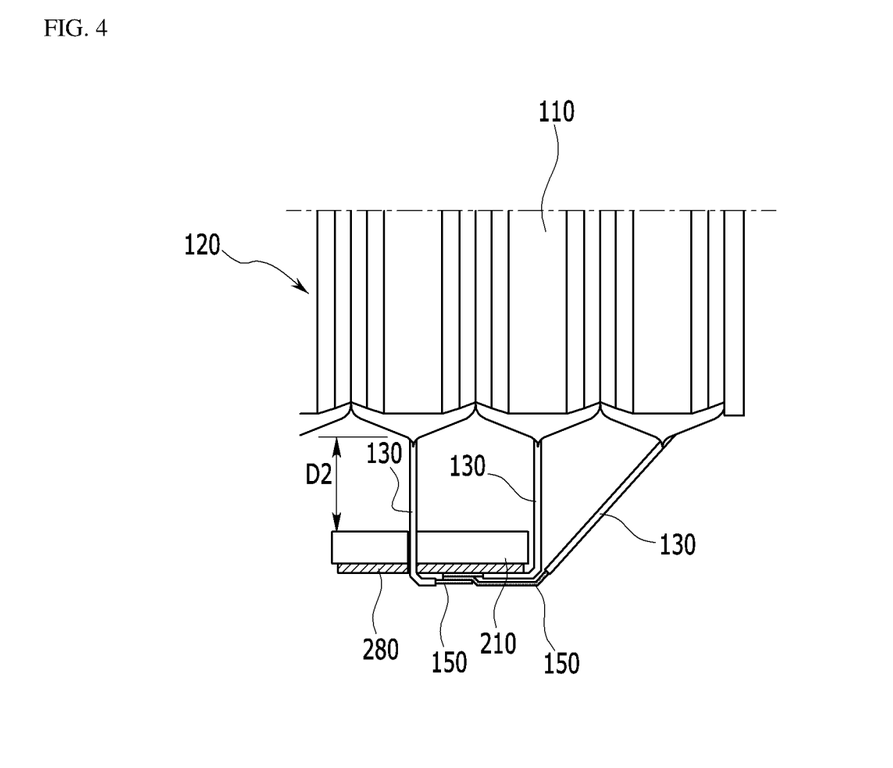
FIG. 4 is a partial plan view schematically illustrating the coupling relationship between the battery cell stack and the busbar in the battery module of FIG. 1.
Figure 5:
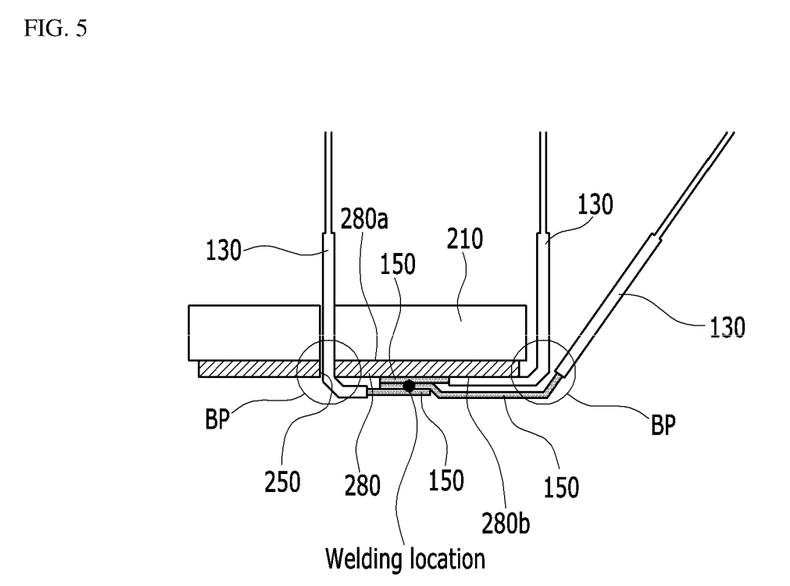
FIG. 5 is an enlarged view illustrating a coupling relationship between an electrode lead and a cell terrace in FIG. 4.

FIG. 4 is a partial plan view schematically illustrating the coupling relationship between the battery cell stack and the busbar in the battery module of FIG. 1. FIG. 5 is an enlarged view illustrating a coupling relationship between the electrode lead and the cell terrace in FIG. 4.

Referring to FIGS. 1, 4, and 5, a plurality of battery cells 110 are stacked in the battery cell stack 120 included in the battery module 100 according to the present embodiment along the Y axis direction, and the electrode lead 150 protrudes from each of the battery cells 110 in X-axis direction.

The battery module 100 according to the present embodiment optimizes the location of the busbar 280 to minimize the size of the battery module 100. To achieve this, the location of the busbar 280 may be moved toward the battery cell 110 while the lengths of the existing cell terrace 130 and the existing electrode lead 150 are maintained. Then, the configuration that passes through the lead slot of the busbar frame 210 and the slot 250 of the busbar 280 may be not the electrode lead 150 but the cell terrace 130.

Referring to FIGS. 1, 2, and 5, the busbar 280 according to the present embodiment includes a first surface 280a facing the battery cell stack 120 and a second surface 280b that is located on an opposite side to the first surface 280a. The cell terrace 130 according to the present embodiment may be bent on the second surface of the busbar 280 after extending from the battery cell 110 and passing through the lead slot of the busbar frame 210 and the slot 250 of the busbar 280. In detail, the cell terrace 130 passes through the slot 250 formed in the busbar 280 from the first surface 280a, and the cell terrace 130 that passed through the slot 250 is bent on the second surface 280b to define a bending part BP.

Because the bending part BP is formed, at the second surface 280b of the busbar 280, the electrode lead 150 protrudes in a direction parallel to the second surface 280b to define a welding part with the busbar 280. The cell terraces each protrude from mutually adjacent battery cells, and adjacent electrode leads 150 protruding from the cell terraces 130 may have the same polarity and may be welded together with the busbar 280. The above-mentioned bending part BP may be formed between the slot 250 of the busbar 280 and the welding part. Due to such a structure, as illustrated in FIG. 4, a second distance D2 between the battery cell stack 120 and the busbar frame 210 is reduced as compared with the first distance D1 of FIG. 3, thus minimizing the size of the battery module 100.

Figure 6:
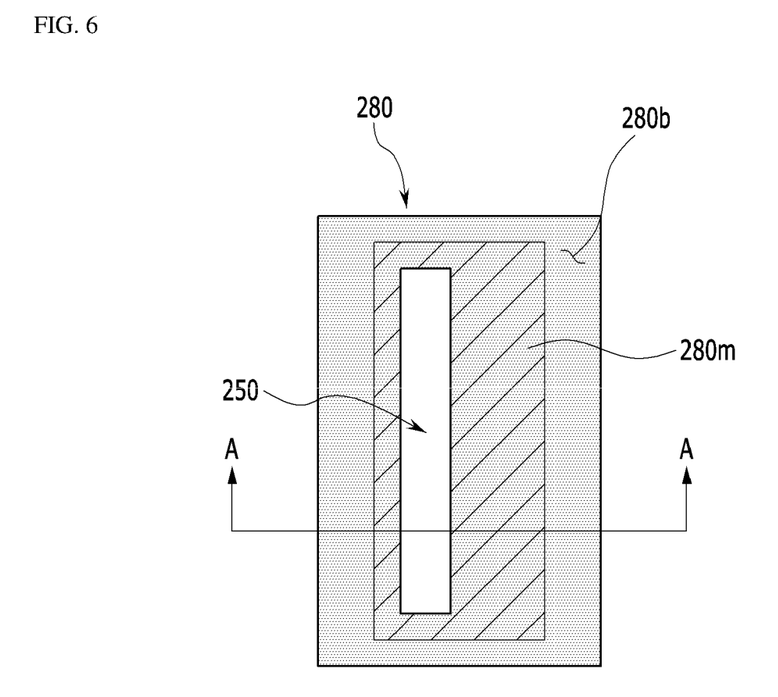
FIG. 6 is a front view illustrating a busbar according to another embodiment of the present disclosure.

FIG. 6 is a front view illustrating a busbar according to another embodiment of the present disclosure.

Referring to FIG. 6, the busbar 280 according to the present embodiment may be formed of not a metal material but an insulation material, unlike the above-mentioned embodiment. The busbar 280 formed of the insulation material can prevent pouch cases including the cell terrace 130 from being corroded as an end of the cell terrace 130 contacts an end of the electrode lead 150, and can prevent the lifetime of the battery cell 110 from being shortened as the cell terrace 130 has a potential. In the busbar 280 according to the embodiment, a separate metal member 280m is formed to connect the electrode leads 150 of the same polarity to each other on the busbar 280 formed of the insulation material. Here, the metal member 280m may be attached on the busbar 280 formed of the insulation member. The metal member 280m may contact the adjacent electrode lead 150 to electrically connect the electrode leads 150 through welding and the like. The metal member 280m is located on the second surface 280b of the busbar 280.

Figure 7:
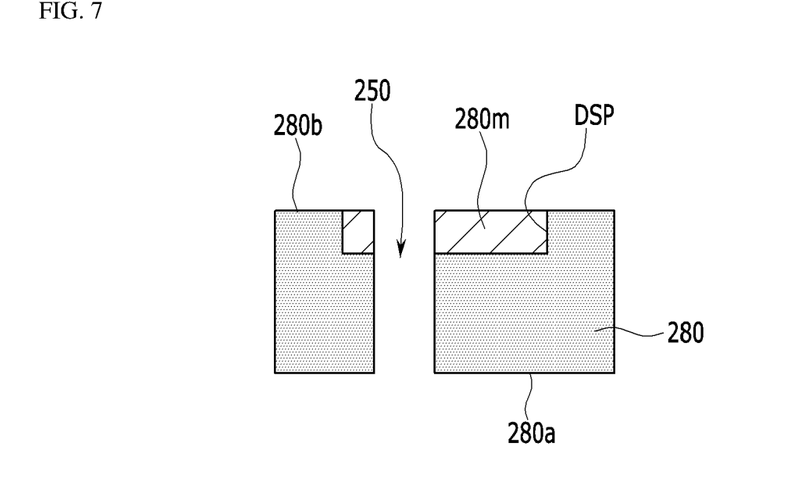
FIG. 7 is a cross-sectional view taken along the cutting line A-A of FIG. 6 illustrating the busbar according to another embodiment of the present disclosure.

FIG. 7 is a cross-sectional view taken along the cutting line A-A of FIG. 6 illustrating the busbar according to another embodiment of the present disclosure.

Referring to FIG. 7, a recessed portion DSP is formed on the second surface 280b of the busbar 280. The metal member 280m may be located in the recessed portion DSP. The size of the battery module can be additionally reduced due to the metal member 280m inserted into the recessed portion DSP.

Although not illustrated, it is possible to form the structure of the busbar 280 as a modified embodiment in which the insulation member is added such that the busbar 280 is formed of the metal material and the insulation member covers the remaining part of the busbar 280 except for a portion of the busbar 280 welded to the electrode lead 150 around the slot 250.

Meanwhile, according to the embodiment of the present disclosure, one or more the battery modules may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
130: cell terrace
150: electrode lead
210: busbar frame
280m: metal member
BP: bending portion

The invention claimed is:
1. A battery module comprising:
a battery cell stack in which a plurality of battery cells are stacked;
a busbar frame connected to the battery cell stack;
a busbar;
cell terraces each protruding from mutually adjacent battery cells among the plurality of battery cells included in the battery cell stack; and
electrode leads each protruding from the cell terraces and having the same polarity;
wherein at least one of the cell terraces defines a bending portion that contacts the busbar,
wherein the busbar comprises a first surface facing the battery cell stack, and a second surface located on an opposite side to the first surface, the at least one of the cell terraces that defines the bending portion passes through a slot formed in the busbar from the first surface and is bent on the second surface to form the bending portion.

2. The battery module of claim 1, wherein
the electrode leads are superimposed on each other on the second surface of the busbar, and
a welding part is formed in a portion of the busbar superimposing on the electrode leads, and the bending portion is formed between the welding part and the slot.

3. The battery module of claim 2, wherein
each of the plurality of the battery cells comprises an electrode assembly and a cell case accommodating the electrode assembly, and
each of the cell terraces extends from the cell case of its respective battery cell to be integrally formed with the cell case.

4. The battery module of claim 1, wherein
the busbar is formed of a metal.

5. The battery module of claim 1, wherein
the busbar is formed of an insulation member.

6. The battery module of claim 5, wherein
a slot, through which at least one of the electrode leads passes, is formed in the busbar and a metal member covering the busbar is formed around the slot.

7. The battery module of claim 6, wherein
the busbar comprises a first surface facing the battery cell stack and a second surface located on an opposite side to the first surface, and
wherein the metal member is located on the second surface.

8. The battery module of claim 7, wherein
the metal member is located in a recessed portion formed in the busbar.

9. A battery pack comprising the battery module of claim 1.

10. A battery module comprising:
a battery cell stack in which a plurality of battery cells are stacked;
a busbar frame connected to the battery cell stack;
a busbar;
cell terraces each protruding from mutually adjacent battery cells among the plurality of battery cells included in the battery cell stack; and
electrode leads each protruding from the cell terraces and having the same polarity;
wherein at least one of the cell terraces defines a bending portion that contacts the busbar,
wherein the busbar is formed of an insulation member, and
wherein a slot, through which at least one of the electrode leads passes, is formed in the busbar and a metal member covering the busbar is formed around the slot.

11. The battery module of claim 10, wherein
the busbar comprises a first surface facing the battery cell stack, and a second surface located on an opposite side to the first surface,
the at least one of the cell terraces that defines the bending portion passes through a slot formed in the busbar from the first surface and is bent on the second surface to form the bending portion.

12. The battery module of claim 11, wherein
the electrode leads are superimposed on each other on the second surface of the busbar, and
a welding part is formed in a portion of the busbar superimposing on the electrode leads, and the bending portion is formed between the welding part and the slot.

13. The battery module of claim 12, wherein
each of the plurality of the battery cells comprises an electrode assembly and a cell case accommodating the electrode assembly, and
each of the cell terraces extends from the cell case of its respective battery cell to be integrally formed with the cell case.

14. The battery module of claim 10, wherein
the busbar is formed of a metal.

15. The battery module of claim 10, wherein
the busbar comprises a first surface facing the battery cell stack and a second surface located on an opposite side to the first surface, and
wherein the metal member is located on the second surface.

16. The battery module of claim 15, wherein
the metal member is located in a recessed portion formed in the busbar.

17. A battery pack comprising the battery module of claim 10.

* * * * *